Jan. 19, 1960     H. C. TIFFT     2,921,317
PORTABLE SHIELD
Filed April 17, 1956     3 Sheets-Sheet 1
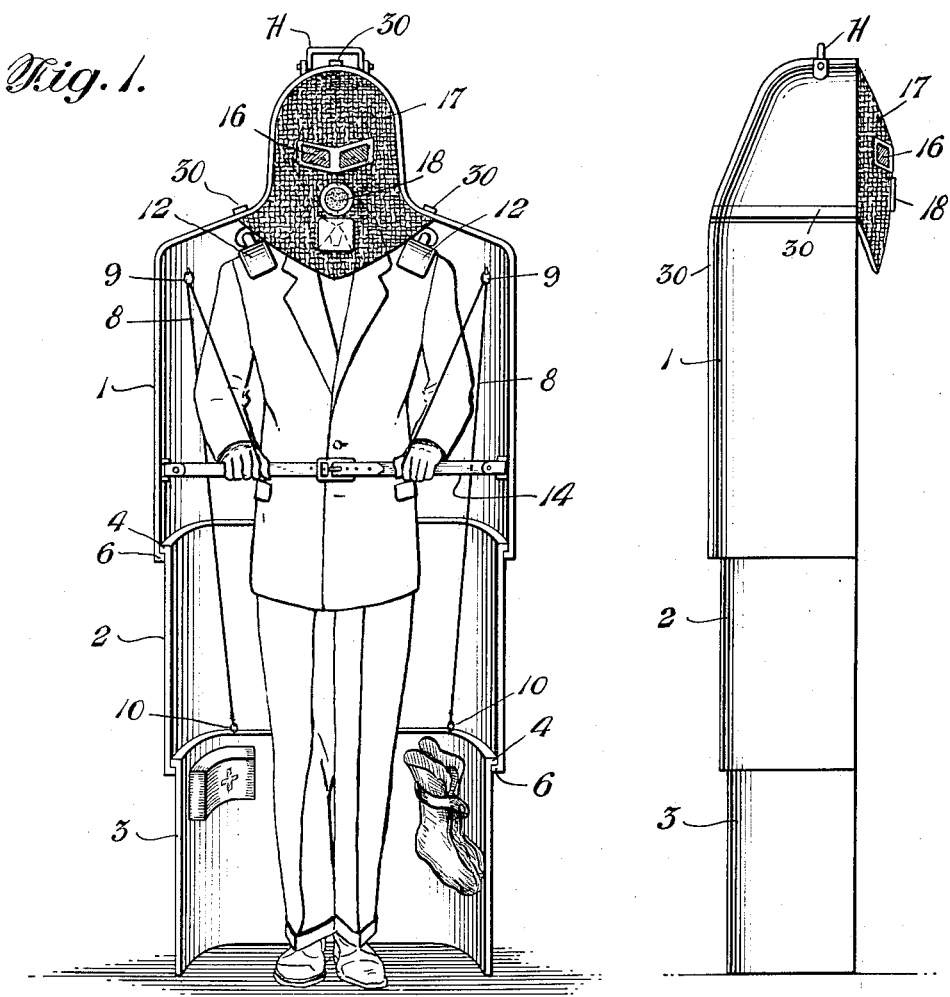
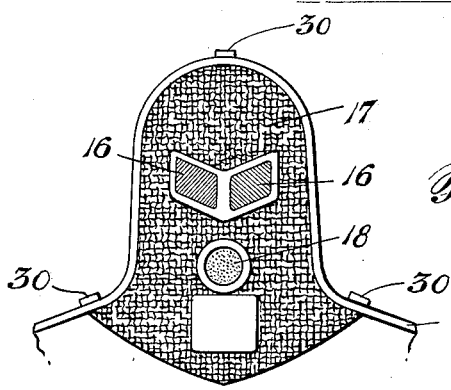
INVENTOR
Harold C. Tifft,
BY Karl W. Flocks
ATTORNEY Jan. 19, 1960
H. C. TIFFT
2,921,317
PORTABLE SHIELD
Filed April 17, 1956
3 Sheets-Sheet 2
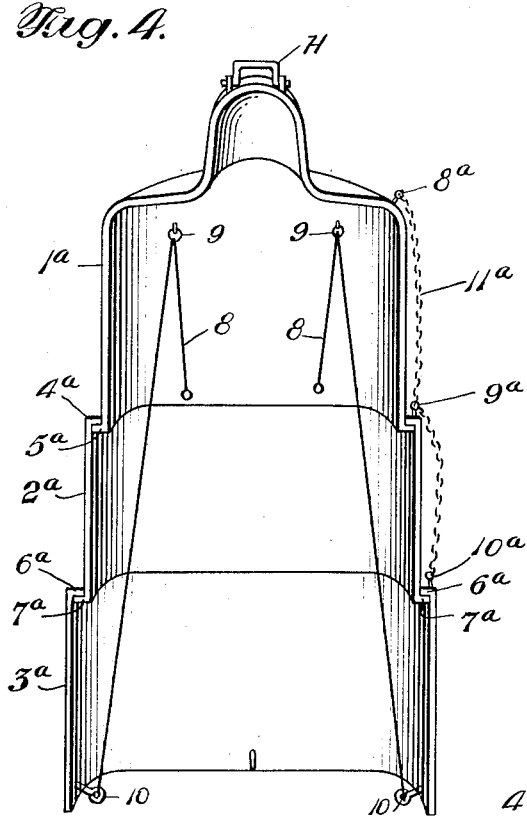
Fig. 4.
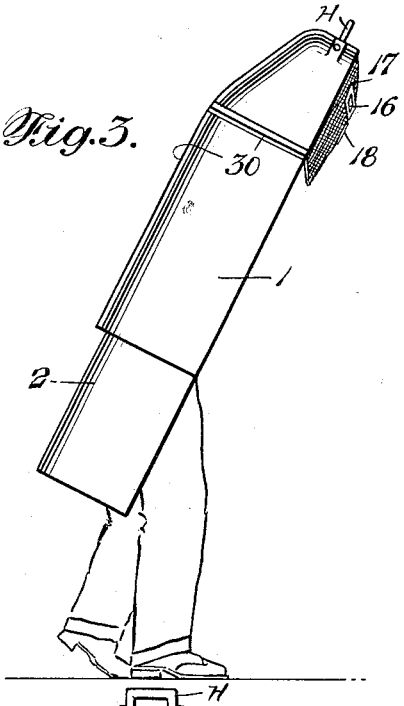
Fig. 3.
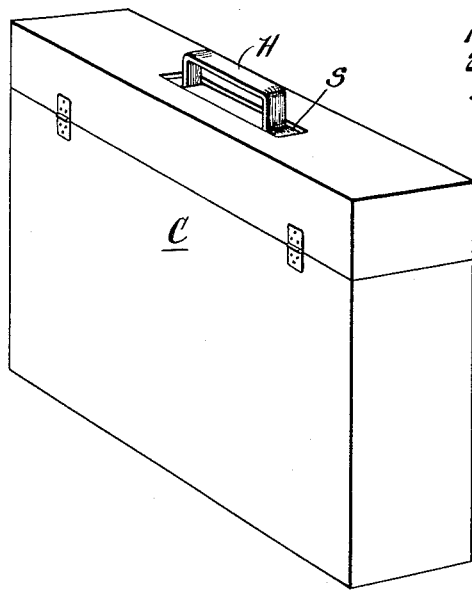
Fig. 5.
Fig. 6.
INVENTOR
Harold C. Tifft
BY Karl W. Flocks
ATTORNEY Jan. 19, 1960    H. C. TIFFT    2,921,317
PORTABLE SHIELD Filed April 17, 1956    3 Sheets-Sheet 3

INVENTOR
Harold C. Tifft,
BY Karl W. Flocks
ATTORNEY

United States Patent Office 2,921,317
Patented Jan. 19, 1960

2,921,317
PORTABLE SHIELD
Harold C. Tifft, Averill Park, N.Y.
Application April 17, 1956, Serial No. 578,691
2 Claims. (Cl. 2—2.5)

This invention generally relates to a portable shield for protecting the human body against conditions and/or forces resulting from various types of explosions. More particularly, this invention pertains to a portable shield which will afford the wearer a considerable degree of safety during times of war.

In one specific embodiment, this invention contemplates a portable and vertically adjustable shield which will protect the wearer against heat, atomic radiation, atomic fall-out and flying debris in the event of nuclear warfare.

As a result of the development and use of the atomic bomb during the last war, and the many subsequent developments in the field of nuclear warfare since that time, many people are sincerely apprehensive about the possibilities of another war. Since it is now apparently quite feasible to project nuclear projectiles over great distances and at great speeds by using jet aircraft, rockets, guided missiles, etc., one of the main concerns of the civilian and military authorities is the problem as to what measures can be taken to protect millions of civilians in the event of a surprise nuclear attack. This problem has many facets which are peculiar to nuclear weapons; namely, harmful atomic radiation, intense heat, and the "fall-out" of the radioactive material from the sky. Immense underground shelters would possibly be one answer to the problem, but even if one could ignore the almost prohibitive cost of such shelters, there still remains the problem as to how to protect those people who would be unable to reach such shelters. It is to this problem that the instant invention is addressed.

The main object of this invention is to provide a portable shield which will serve to guard the human body from the injurious or lethal effects of a nuclear explosion.

A second object of this invention is to provide a portable shield against nuclear explosions which can be easily and quickly placed around a considerable portion of the human body.

Another object of this invention is to provide a shield which can be adjusted so that it will substantially cover the entire body of the wearer, regardless of whether the wearer is in a standing, sitting or reclining position.

A further object of this invention is to provide a shield for the body which, in addition to being portable, also can be readily adjusted by the wearer so as to permit him to run from one place to another and yet still have a substantial measure of protection on the upper portion of his body.

Other and further objects of the invention will appear in the course of the following description.

Very briefly, this invention relates to a portable shield which is adapted to surround a substantial portion of the human body and which is constructed in such a fashion that several of its component parts can be moved in telescoping relationship to one another. This will be clearer when the reader refers to the particular embodiments shown in the drawings, in which:

Fig. 1 is a perspective view of one form of such a shield when in use by a wearer;

Fig. 2 is a side view of the shield shown in Fig. 1;

Fig. 3 is a pictorial view of the shield shown in Fig. 1 in use when the wearer is walking;

Fig. 4 is a front perspective view of a second possible embodiment of the shield of this invention;

Fig. 5 is a perspective view of the embodiment shown in Fig. 4, showing how the several sections can be telescoped together;

Fig. 6 is a view in perspective of a carrying case with the handle for the head section extending through the cover thereof;

Fig. 8 is a front detailed view of face protective means which may form a part of the shield of this invention.

Figure 7:
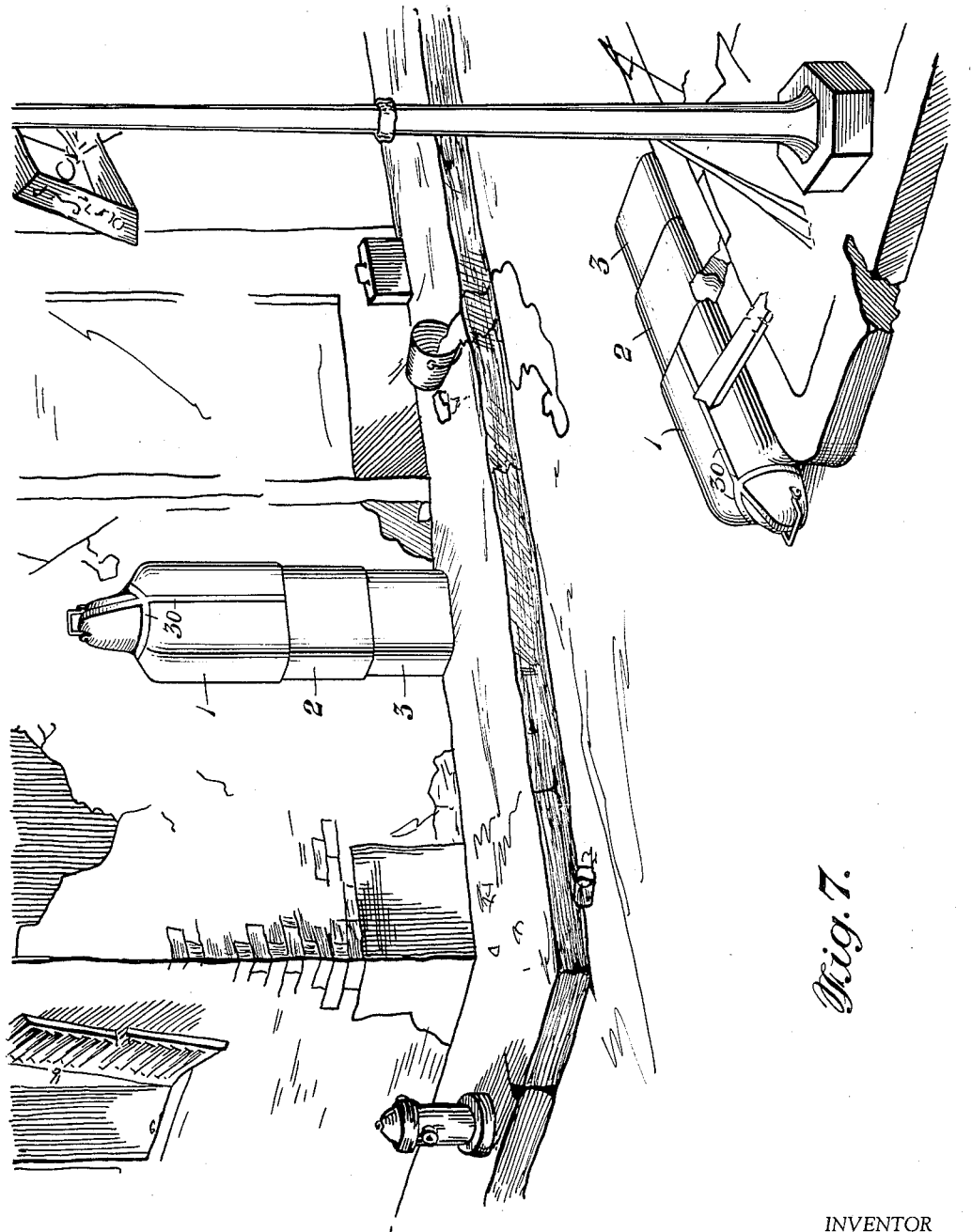
Fig. 7 is an illustration showing how the shields of this invention would actually be put to use in vertical and horizontal positions during times of danger.

In the embodiment shown in Figs. 1 and 2, it is seen that the body shield comprises three main U-shaped sections. An upper bell-like section 1 is shown covering the head and upper portion of the body and immediately therebelow are a plurality of somewhat similar U-shaped sections which are adapted to slidably engage or telescope within one another and within upper section 1. Thus, middle section 2 has a diameter slightly less than that of upper section 1 and lower section 3 is in turn of slightly less diameter than middle section 2. Engaging lips 4 and 6 limit the spaced apart relationship of sections 1, 2 and 3, by engaging a corner or portion of the upper area of the next lower section. Lower section 3 can be telescoped within middle section 2, and middle section 2 can be telescoped within section 1. It will be understood that there are many other ways in which the plurality of sections can be constructed so that they will telescope together. For example, as is shown in Figs. 4 and 5, the middle section 2a could just as well be of larger diameter than the upper section 1a and the lower section 3a could be of larger diameter than the middle section 2a. In Figs. 4 and 5, an alternate type of engaging lip is illustrated, the inwardly extending lips 4a and 6a being adapted to engage the outwardly extending lips 5a and 7a, respectively, so as to thereby limit the downward movement of sections 2a and 3a. Figs. 5 and 6 are examples of how the plurality of shield sections could easily be telescoped together in the minimum amount of space. When the sections are in telescoped relationship, they may be stored in a suitable box or carrying case C provided with a slot S through which the handle H may project.

Although the shield heretofore described in this specification is perfectly suitable and stable without further modification, it is clear that it is possible to incorporate a variety of means which would insure that the component parts of the shield could not be accidentally disengaged from one another. For example, a light and flexible wire or chain 11a could suitably be joined to points 8a, 9a and 10a (as shown in Fig. 4). Alternatively, it will be obvious that one could make provision for a vertical tongue and groove type of engagement between alternate vertical sections of the shield. Other guiding or circumferential motion restricting means will readily occur to those skilled in the art.

The several sections may be raised and lowered with respect to each other by using any desired manual or mechanical means. For example, handles located on the interior of each section (not shown) would allow the wearer to move the various sections manually. If desired, one could also employ a rope or wire and pulley means, such as that indicated at 8, 9 and 10 to raise the lower telescoping sections.

It is to be understood that whereas Fig. 1 only shows a shield consisting of three sections, there may in fact be any desired number of sections. Also, although Fig. 1 shows that the various sections are generally U-shaped, the exact shape is not particularly important insofar as utility is concerned. Each section could, in fact, be substantially cylindrical. It is probable that the most desirable shape in any instance will be governed by considerations as to the cost of the material employed and the method used for fabricating and joining the sections together.

It is preferable that the straight forward vertical edges of each of the telescoping sections be disposed in approximately the same plane or in closely adjacent planes (see Fig. 2.) The reason for this will be apparent after inspecting Fig. 7, which illustrates how it is contemplated that the shield of this invention might be put to use at the time a bomb is exploded.

The various sections of the shield may be fabricated from any number of metallic or non-metallic materials and the choice in this respect will probably vary from time to time depending upon the nature of the danger which it is anticipated that the wearer might encounter. For example, part or all of the shield could be constructed of steel, aluminum, titanium, reinforced plastics, high strength and shatter-resistant glass, etc. When hazards of atomic irradiations are the foremost consideration, lead, lead compounds or any material capable of deflecting or absorbing these harmful radiations could be incorporated into various sections (or all) of the shield. For example, it is known that lead or lead compounds dispersed through glass forms an effective barrier against radiation. A similar idea would appear feasible with various plastic materials instead of glass. When shock waves or flying debris would be the primary hazard, thin sheets of steel or aluminum might be a preferable material of construction, although modern techniques for reinforcing plastics (e.g.—with fiber glass) and glass might permit the use of either of these materials. As is well known, bullet-proof jackets are currently being made from non-metallic materials. When heat is considered to be the primary hazard, sheet steel or aluminum would probably be preferable. Compounds of asbestos, such as asbestos cloth, may of course be used where desired to provide protection against heat. It is believed that from the standpoint of overall serviceability and utility, a shield constructed primarily of sheet aluminum with a few strips of reinforcing steel 30 would be most desirable.

Since it may often be desirable to maintain the above-described shield, a fixed distance from the wearer's body, a number of body spacing means may be incorporated into the shield. By way of illustration, but not by way of limitation, two shoulder rests 12 or shoulder pads could easily be attached to the interior surface of upper section 1, as is shown in Figs. 1 and 4. This serves to prevent the wearer's head and shoulders from coming into direct contact with the shield, thus decreasing heat conduction hazards. It is, of course, obvious that the interior of the shield could be padded wherever desired so as to minimize any injuries which might be sustained if the shield were to be suddenly or unexpectedly bumped or slammed against the wearer's body.

The interior of the shield may also contain any desired arrangement of straps, such as that shown at 14, which can be either fastened to the wearer's body or grasped by the wearer to insure stability and a better sense of control and balance when moving within the shield.

The upper section of the shield need have no face protection or air breathing means, since, as is illustrated in Figs. 1 and 7, it is contemplated that the wearer of the shield can obtain ample protection from nuclear and other explosions by simply facing the open end of his shield flush up against a wall, or when in a reclining position, flush down against the floor or ground. It is clear, however, that a face protective device and/or air conditioner could easily be incorporated into the upper section of the shield.

For example, referring to Fig. 8, the open area of the shield adjacent to the head may be covered with asbestos material 17 or its equivalent, with suitable openings and provisions for vision 16 and breathing 18.

It is obvious that a number of different types of modified gas masks might be thus incorporated into the upper portion of the shield. The breathing portion may be designed to remove injurious atomic contaminations from the air, in addition to purifying it in a conventional manner.

If desired, provisions may be made for attaching a limited supply of medicinal supplies, food, water, clothing, etc. to the interior of one or more of the telescoping sections, so long as such attachments will not interfere with the telescoping action. The shield may also contain any equipment which would be useful in indicating the existence of dangerous radioactive conditions.

One can readily see that the above described shield is a potential life-saver for civilians during times of war. The compactness of the shield (due to the telescoping of the various sections) permits the owner thereof to easily carry it with him from place to place. Also, due to its compactness, it can be easily and unobtrusively stored in either the office or the home. When an alarm is sounded by civil defense authorities, civilians who have the described shield close at hand would be able to fit themselves with the shield in a very short period of time. A civilian thus outfitted could then place himself against the floor, the ground, or a vertical surface and wait until the explosion has occurred or the danger passed. The fact that each lower section telescopes with the section next above it enables the wearer to raise as many sections as may be necessary to permit walking or running in the event that the wearer is suddenly forced to abandon his position in favor of a safer one. Since the shield is of such simple construction it can be readily mass produced, e.g., by stamping or molding procedures, at a rather nominal cost. It goes without saying that the shield would also have considerable value to military personnel in combat zones.

Having described the present invention generally, and also with regard to several specific embodiments, it is to be understood that other modes of applying the underlying principles of my invention will be readily apparent to those skilled in the art and, accordingly, the following claims are intended to be the true measure of my contribution to the art.

What is claimed is:

1. A portable device made of a rigid material for increasing the protection of the human body against deleterious conditions and forces which comprises an upper semi-bell-like section having a size and shape adapted to cover at least the head and shoulders of the wearer's body, at least two imperforate curved generally U-shaped sections located below said bell-like section and which are arranged to move in at least a limited telescoping relationship with one another, and in an extended position in conjunction with said upper section adapted to cover the entire length of the user, the interior of at least two of said sections containing means for causing the sections to move in telescoping relationship with one another, and all of said sections having coplanar lateral edges.

2. A device as set forth in claim 1, wherein means are provided for spacing the device at a distance from the wearer's body and wherein there is additionally provided means for stabilizing the movement of the device relative to the wearer's body.

References Cited in the file of this patent
UNITED STATES PATENTS

| | | |
|---|---|---|
| 558,812 | Hunt | Apr. 21, 1896 |
| 1,088,340 | Hamburger | Feb. 24, 1914 |
| 1,238,120 | Flanagan | Aug. 28, 1917 |
| 1,277,706 | Dorfman | Sept. 3, 1918 |
| 1,368,786 | De Groff | Feb. 15, 1921 |
| 2,050,178 | Hite | Aug. 4, 1936 |
| 2,139,579 | Dier | Dec. 6, 1938 |
| 2,529,106 | Schauweker | Nov. 7, 1950 |